United States Patent [19]

Allen

[11] 4,044,926
[45] Aug. 30, 1977

[54] GRANULAR METERING

[76] Inventor: Kenneth M. Allen, P.O. Box 352, Newberg, Oreg. 97132

[21] Appl. No.: 757,897

[22] Filed: Jan. 10, 1977

Related U.S. Application Data

[63] Continuation of Ser. No. 646,256, Jan. 2, 1976, abandoned, which is a continuation of Ser. No. 500,313, Aug. 26, 1974, abandoned, which is a continuation of Ser. No. 361,857, May 21, 1973, abandoned.

[51] Int. Cl.² ............................................. G01F 11/00
[52] U.S. Cl. ..................................... 222/409; 222/478
[58] Field of Search ...................... 222/226, 409, 478; 209/245, 254; 241/262, 263, 264, 267; 118/308, 608; 99/494

[56] References Cited
FOREIGN PATENT DOCUMENTS
445,291  11/1912  France ................................. 222/409

*Primary Examiner*—Allen N. Knowles
*Attorney, Agent, or Firm*—Klarquist, Sparkman, Campbell, Leigh, Hall & Whinston

[57] ABSTRACT

An abrading member is moved back and forth over a discharge opening of a hopper to abrade lumps of salt in the hopper to cause all of the salt passed out of the opening to be free flowing. The abraded member is moved with a slotted spreader tray positioned below the opening of the hopper and movable past a spreader plate extending down from the opening, and the salt drops through the slots onto food particles on a conveyor therebelow.

13 Claims, 5 Drawing Figures

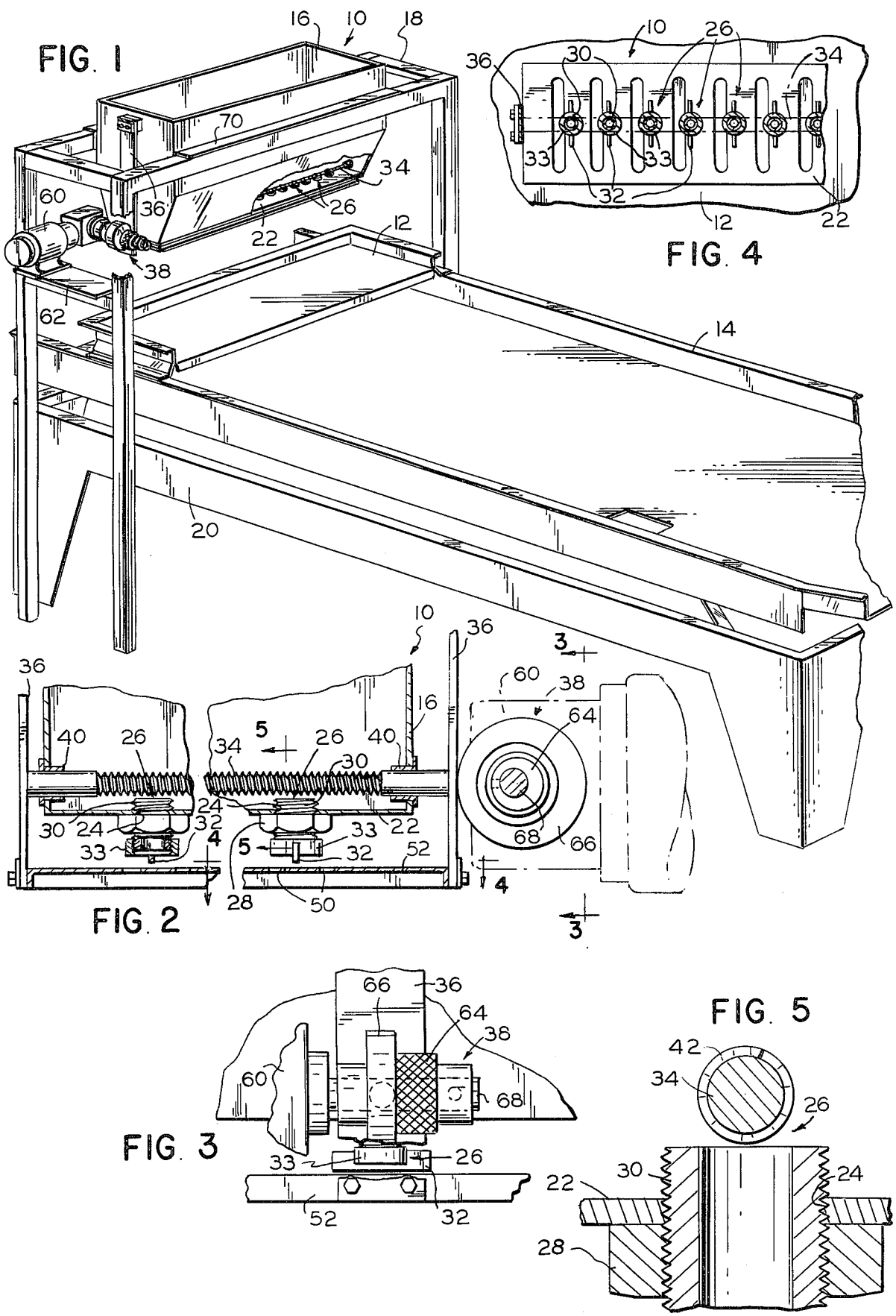

GRANULAR METERING

This is a continuation of my application Ser. No. 646,256, filed Jan. 2, 1976, now abandoned, which is a continuation of application Ser. No. 500,313, filed Aug. 26, 1974, abandoned, which, in turn, is a continuation of application Ser. No. 361,857, filed May 21, 1973, abandoned.

This invention relates to an improved device for metering granular material, and more particularly to an improved device for salting food products.

An object of the invention is to provide a new and improved device for metering granular material.

Another object of the invention is to provide a new and improved device for salting food products.

A further object of the invention is to provide a metering device which abrades lumps of granular material and meters the material in a uniform flow.

Another object of the invention is to provide a metering device wherein a screw having an abrading thread is reciprocated past an outlet of a hopper to abrade lumps of material so that it can flow through the outlet.

Another object of the invention is to provide a metering device including a hopper having a discharge orifice above a slotted plate which is reciprocated at a selected distance below the orifice to discharge the material into the slots at a uniform rate.

Another object of the invention is to provide a metering device including a tubular orifice member adjustably secured to the bottom of a hopper and having a vane extending laterally from the orifice member for assisting the orifice member to spread material discharged from the orifice member onto a slotted plate reciprocated relative to the orifice member and the vane.

In the drawings:

FIG. 1 is a fragmentary, perspective view of an improved device for metering granular or particulate material forming one embodiment of the invention;

FIG. 2 is an enlarged, fragmentary, vertical sectional view thereof;

FIG. 3 is an enlarged, fragmentary, vertical sectional view taken along line 3—3 of FIG. 2;

FIG. 4 is an enlarged, fragmentary, horizontal sectional view taken along line 4—4 of FIG. 2; and, FIG. 5 is an enlarged, fragmentary, vertical, sectional view taken along line 5—5 of FIG. 2.

Referring now in detail to the drawings, a metering device 10 shown therein and forming one specific embodiment of the invention is mounted above a short, three-sided tray 12 of a vibratory conveyor table 14 driven to feed articles to be salted from left to right, as viewed in FIG. 1. The vibrated tray 12 spreads salt metered thereto in partially spread conditions, and the tray 12 may be mounted and vibrated independently of the conveyor table 14, if desired. Also, the conveyor table could be a belt conveyor if desired. Further, the tray could be provided with a slightly upturned discharge edge to enhance the spreading effect, or the spreading effected by the tray could be done by a slowly rotating brush or screw. A hopper 16 supported in fixed position by a frame 18 mounted on fixed frame 20 of the conveyor has a bottom 22 (FIG. 2) provided with a row of tapped holes 24 in which tubular orifices 26 are mounted. The orifices include threaded nipples 30, adjustably screwed into the tapped holes 24 and secured by nuts 28. Spreader plates 32 are mounted by collars 33 on the lower ends of the nipples.

An elongated, sharp threaded rod 34 is carried by leaf springs 36 which are secured rigidly at their upper ends to ends of the hopper. The rod is reciprocated longitudinally by an adjustable, eccentric drive 38, and is centered over and spaced slightly above the orifices 26 (FIG. 5). The rod has smooth, cylindrical end portions fitting closely and slidably in bushings 40 in the end walls of the hopper. The rod has a sharp-edged thread 42 and acts as a file, rasp or abrading member on the salt in the hopper to file away any lumps of salt. The rod also forms metering orifices with the upper ends of the orifices 26, and prevents lumps from passing into the orifices 26. If desired, the upper ends of the orifices 30 may be arcuately concave and concentric with the threaded rod 34, and the cylindrical passages in the orifices may be replaced by conical passages tapering from smaller at their upper ends to larger at their lower ends where material tending to bridge is metered.

The orifices 30 are substantially centered between adjacent pairs of slots 50 (FIG. 2) in a receiving plate 52 bolted to the lower ends of the springs 36. The spreader plates 32 are spaced slightly above the plate 52 and spread the salt evenly on the plate so that it passes through the slots with an even distribution as the plate 52 is reciprocated with the rod 34, the center of the throw of each spreader plate 32 being midway between the adjacent slots and the length of the throw being sufficient to push a metered quantity of the salt into each slot for each stroke of the plate 52.

The drive 38 includes a variable speed motor 60 (FIG. 1) mounted on plate 62 of the frame 18, and has two eccentric cams 64 and 66 adjustably keyed to an output shaft 68 of the motor 60. When the motor is energized, it rotates the cams 64 and 66. The springs 36 are biased to the right as viewed in FIG. 2 so that the righthand spring 36 constantly engages the cam 66, and rotation of the cams reciprocate the threaded rod 34 and the spreader plate 52. The hopper 16 has flanges 70 (FIG. 1) resting on rails 72 of the frame 18.

If desired, in place of the tray 12 which acts as a spreader, a pair of elongated fluted rolls having intermeshing teeth extending the entire lengths thereof may be positioned below the plate 52 so as to catch all of the salt coming from the slots. These rolls would be rotated in directions such that the upper portions thereof travel away from each other. The salt falls in the grooves in the rolls and is spread further as it is carried up over the upper profiles of the rolls and dropped out of the grooves.

What is claimed is:
1. In a metering device,
a hopper having a bottom having a tapped bore,
a vertical nipple screwed into the bore,
a locking nut on the nipple for holding the nipple in adjusted position relative to the hopper,
a receiving plate movable below the nipple and serving to support granular material dispersed through the nipple except when the plate is moved across the nipple,
and a movable abrading member above the nipple and extending across the upper end of the nipple in a position such as to block flow of lumps of the granular material through the nipple.

2. In a metering device:
a hopper having a discharge orifice,
receiving plate means below the orifice for receiving granular material from the orifice and movable relative to the orifice only within limits in which the receiving plate means, if stationary, would support material from the orifice, means for moving the receiving plate means relative to the orifice transversely of the orifice to push the material off the receiving plate means, abrading means positioned in the hopper comprising a file-like member extending crosswise of the orifice and movable back and forth across the orifice, and means mounting the file-like member for such movement in a position spaced from the orifice to allow non-lumpy granular material to flow into the orifice and close enough to the orifice to prevent flow of lumps of granular material into the orifice.

3. The metering device of claim 2 wherein the file-like member is moved with the receiving plate means.

4. In a metering device;

a hopper having a bottom provided with a wall having a discharge orifice therethrough, a screw having a sharp-edged thread portion and positioned above the orifice and extending thereacross, and drive means for reciprocating the screw longitudinally across the orifice to abrade material flowing to the orifice, the screw being positioned close to the orifice so as to prevent lumps of material from passing into the orifice.

5. The metering device of claim 4 including a flow regulating member positioned below the orifice and moved relative to the orifice by the drive means.

6. The metering device of claim 5 wherein the flow regulating member includes a plate below and in line with the orifice, the drive means including a pair of hanger arms bracketing and hung on the hopper, the arms carrying the plate, the screw extending slidably through the hopper and engaging the arms, and means for swinging the arms to reciprocate the plate and the screw.

7. In a metering device:

a hopper having a bottom having a plurality of orifices spaced therealong, plate means having a plurality of plate portions spaced therealong with openings therebetween, means mounting the plate means spaced from and directly below the orifices for movement relative to the orifices between limits such that the plate portions always support material from the orifices to prevent continuous flow from the orifices to the openings but cause granular material to be pushed into the openings when the plate means is moved between said limits, and means for moving the plate means between said limits, the orifices being mounted in a row and the plate portions being mounted in a row, the hopper including a plurality of spaced tubular members defining the orifices and projecting below the bottom of the hopper.

8. The metering device of claim 7 wherein the plate means is a plate having slots defining the openings therein.

9. The metering device of claim 8 wherein the discharge orifice includes a boss-like entrance portion projecting upwardly from the bottom of the hopper.

10. In a powdered material dispensing device;

a hopper having a bottom having an orifice, a screw-like abrader having a sharp-edged thread portion, means mounting the abrader in a position just above and extending transversely across the orifice for longitudinal reciprocation so as to block flow of lumps of granular material through the orifice, and drive means reciprocating the abrader longitudinally to abrade material flowing to the orifice.

11. The metering device of claim 10 wherein the orifice includes an entrance portion extending upwardly from the bottom of the hopper.

12. The metering device of claim 11 wherein the tubular members are nipples and including nut means mounting the nipples adjustably on the bottom of the hopper.

13. In a powdered material dispensing device;

a hopper having a bottom having a downwardly directed orifice, a screw-like abrader, means mounting the abrader in a position just above and extending transversely across the orifice for longitudinal reciprocation so as to block flow of lumps of granular material through the orifice, and drive means for reciprocating the abrader to abrade material flowing to the orifice.

* * * * *